United States Patent
Kang et al.

(10) Patent No.: US 7,417,528 B2
(45) Date of Patent: Aug. 26, 2008

(54) RFID DEVICE HAVING NONVOLATILE FERROELECTRIC MEMORY DEVICE

(75) Inventors: Hee Bok Kang, Daejeongwangyeok-si (KR); Jin Hong Ahn, Gyeonggi-do (KR)

(73) Assignee: Hynix Semiconductor Inc., Icheon-si (KR)

( * ) Notice: Subject to any disclaimer, the term of this patent is extended or adjusted under 35 U.S.C. 154(b) by 259 days.

(21) Appl. No.: 11/325,486

(22) Filed: Jan. 5, 2006

(65) Prior Publication Data

US 2007/0018821 A1    Jan. 25, 2007

(30) Foreign Application Priority Data

Jul. 20, 2005    (KR) .................. 10-2005-0065786

(51) Int. Cl.
 *H04Q 5/22* (2006.01)
(52) U.S. Cl. ................ 340/10.34; 365/145; 365/189.11
(58) Field of Classification Search ............... 340/10.1, 340/10.3, 10.34, 693.1, 693.3, 572.1; 365/145, 365/189.11, 196
See application file for complete search history.

(56) References Cited

U.S. PATENT DOCUMENTS

| | | | |
|---|---|---|---|
| 5,926,110 A | 7/1999 | Downs | 340/825.54 |
| 6,809,952 B2 | 10/2004 | Masui | 365/145 |
| 6,820,208 B2 | 11/2004 | Hoshino | 713/340 |
| 7,289,028 B2 * | 10/2007 | Kofler | 340/572.4 |
| 2003/0141989 A1 | 7/2003 | Arisawa | 340/870.01 |
| 2007/0132557 A1 * | 6/2007 | Kang et al. | 340/10.34 |

FOREIGN PATENT DOCUMENTS

| | | |
|---|---|---|
| JP | 2003-076953 A | 3/2003 |
| WO | 03/105078 A1 | 12/2003 |
| WO | WO 2004013807 A1 * | 2/2004 |

* cited by examiner

*Primary Examiner*—Thomas J Mullen, Jr.
(74) *Attorney, Agent, or Firm*—Townsend and Townsend and Crew LLP

(57) ABSTRACT

A RFID device has a nonvolatile ferroelectric memory including a memory cell array area supplied only with a high voltage and a peripheral area supplied with a low voltage, thereby reducing power consumption. The RFID device includes an antenna adapted and configured to transceive a radio frequency signal from an external communication apparatus, an analog block adapted and configured to generate a power voltage in response to the radio frequency signal received from the antenna, a digital block adapted and configured to receive the power voltage from the analog block, transmit a response signal to the analog block and output a memory control signal, and a memory adapted and configured to generate a high voltage with the power voltage and access data in response to the memory control signal.

15 Claims, 7 Drawing Sheets

RFID DEVICE HAVING NONVOLATILE FERROELECTRIC MEMORY DEVICE

BACKGROUND OF THE INVENTION

1. Field of the Invention

The present invention generally relates to a RFID device having a nonvolatile ferroelectric memory, and more specifically, to a technology of supplying a high voltage only to a memory cell array area of a FeRAM in the RFID device and a low voltage to peripheral areas to reduce power consumption.

2. Description of the Related Art

Generally, a ferroelectric random access memory (hereinafter, referred to as 'FeRAM') has attracted considerable attention as next generation memory device because it has a data processing speed as fast as a Dynamic Random Access Memory (hereinafter, referred to as 'DRAM') and preserves data even after the power is turned off.

The FeRAM having structures similar to the DRAM includes the capacitors made of a ferroelectric substance, so that it utilizes the high residual polarization characteristic of the ferroelectric substance in which data is not deleted even after an electric field is eliminated.

The technical contents on the above FeRAM are disclosed in U.S. Pat. No. 6,775,172 by the same inventor of the present invention. Therefore, the basic structure and the operation on the FeRAM are not described herein.

FIG. 1 is a diagram illustrating a Radio Frequency Identification (hereinafter, referred to as "RFID") device including a FeRAM.

The RFID includes an antenna 10, an analog block 20, a digital block 30 and a memory 40.

The antenna 10 transmits and receives a radio frequency signal of an external reader or writer.

The analog block 20 includes a voltage multiplier 21, a voltage limiter 22, a modulator 23, a demodulator 24, a voltage doubler 25, a power-on reset unit 26 and a clock generating unit 27.

The voltage multiplier 21 generates a power voltage VDD of the RFID device in response to the radio frequency signal applied from the antenna 10.

The voltage limiter 22 limits a voltage of the radio frequency signal applied from the antenna 10.

The modulator 23 modulates a response signal Response applied from the digital block 20 to transmit the signal Response to the antenna 10.

The demodulator 24 detects an operation command signal from the radio frequency signal applied from the antenna 10 by a power voltage VDD to output the command signal CMD to the digital block 30.

The voltage doubler 25 boosts the power voltage VCC applied from the voltage multiplier 21 to supply a boosting voltage VDD2 having a swing width twice as large as the power voltage VDD to the memory 40.

The power-on reset unit 26 senses the power voltage VDD applied from the voltage multiplier 21 to output a power-on reset signal POR for controlling a reset operation to the digital block 30.

The clock generating unit 27 generates a clock signal CLK by the power voltage VDD.

The digital block 30 receives the power voltage VDD, the power-on reset signal POR, the clock signal CLK and the command signal CMD from the analog block 20 to output the response signal Response to the analog block 20. The digital block 30 outputs an address ADD, data I/O, a control signal CTR and the clock signal CLK to the memory 40.

The memory 40 has a plurality of memory cells each including a nonvolatile ferroelectric capacitor.

FIG. 2 is a waveform diagram illustrating the relationship between power consumption and the output voltage of the voltage multiplier of the RFID device of FIG. 1.

In the RFID device, the output voltage VDD of the voltage multiplier 21 of FIG. 1 which is a voltage generator becomes higher when the amount of operating current is small as shown in graph A, and the output voltage VDD becomes lower when the amount of current become large as shown in graph B.

In the RFID device, the analog block 20 and the digital block 30 can be driven only by the low voltage VDD while the memory 40 requires the high voltage VDD2. As a result, the memory 40 receives the high voltage VDD2 from the voltage doubler 25.

The memory 40 has a memory cell array area (not shown) and a peripheral area. The high voltage VDD2 supplied from the voltage doubler 25 of FIG. 1 is required from the memory cell array area (not shown), and the peripheral area can be driven by a voltage lower than the voltage VDD2.

Other areas can be driven only by a low voltage although a high voltage is required in the memory cell array area (not shown) of the memory 40. However, a high voltage is supplied to all areas of the memory 40, which results in unnecessary power consumption.

SUMMARY OF THE INVENTION

Various embodiments of the present invention are directed at supplying a high voltage only to a memory cell array area and a low voltage to a peripheral area in a memory of a RFID device, thereby minimizing power consumption.

According to an embodiment of the present invention, a RFID device includes an antenna adapted and configured to transceive a radio frequency signal from an external communication apparatus, an analog block adapted and configured to generate a power voltage in response to the radio frequency signal received from the antenna, a digital block adapted and configured to receive the power voltage from the analog block, transmit a response signal to the analog block and output a memory control signal, and a memory adapted and configured to generate a high voltage with the power voltage and access data in response to the memory control signal. The memory has a memory cell array area driven by the high voltage and a peripheral circuit area driven by the power voltage.

According to another embodiment of the present invention, a RFID device includes an antenna adapted and configured to transceiver a radio frequency signal from an external communication apparatus, an analog block adapted and configured to generate a first voltage in response to the radio frequency signal received from the antenna, a digital block adapted and configured to receive the first voltage from the analog block, transmit a response signal to the analog block and output a memory control signal, and a memory adapted and configured to generate a second voltage which is higher than the first voltage and access data in response to the memory control signal. The memory has a memory cell array area driven by the second voltage and an peripheral circuit area driven by the first voltage.

BRIEF DESCRIPTION OF THE DRAWINGS

Other aspects and advantages of the present invention will become apparent upon reading the following detailed description and upon reference to the drawings in which.

DETAILED DESCRIPTION OF THE EXEMPLARY EMBODIMENTS

The present invention will be described in detail with reference to the accompanying drawings. Wherever possible, the same reference numbers will be used throughout the drawings to refer to the same or like parts.

Figure 1:
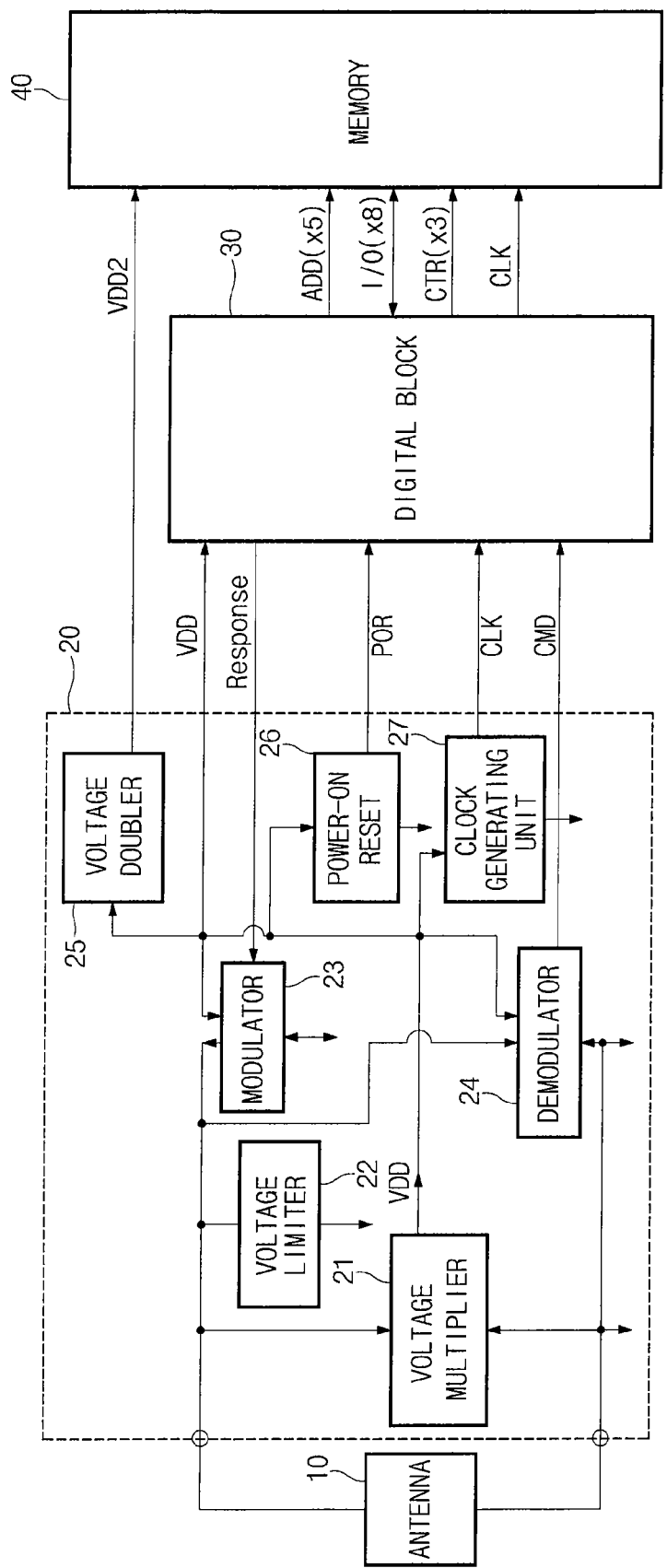
FIG. 1 is a diagram illustrating a RFID device.
Figure 2:
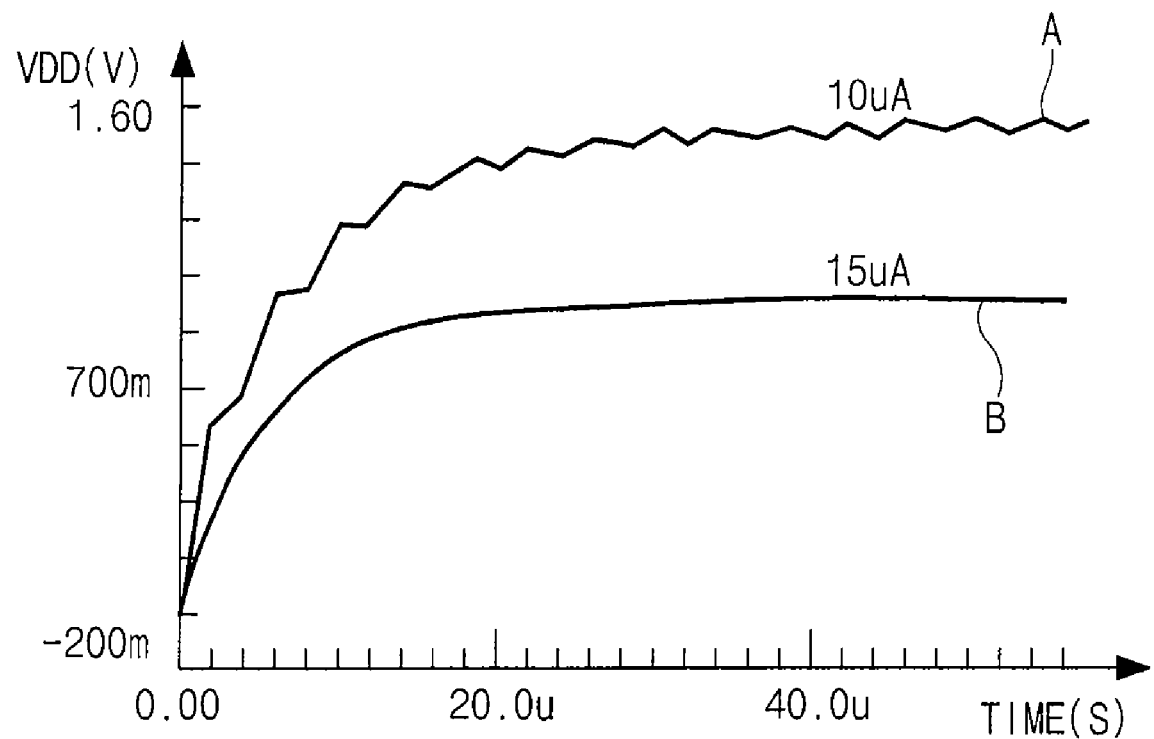
FIG. 2 is a waveform diagram illustrating the relationship between power consumption and an output voltage of a voltage multiplier of the RFID device of FIG. 1.
Figure 3:
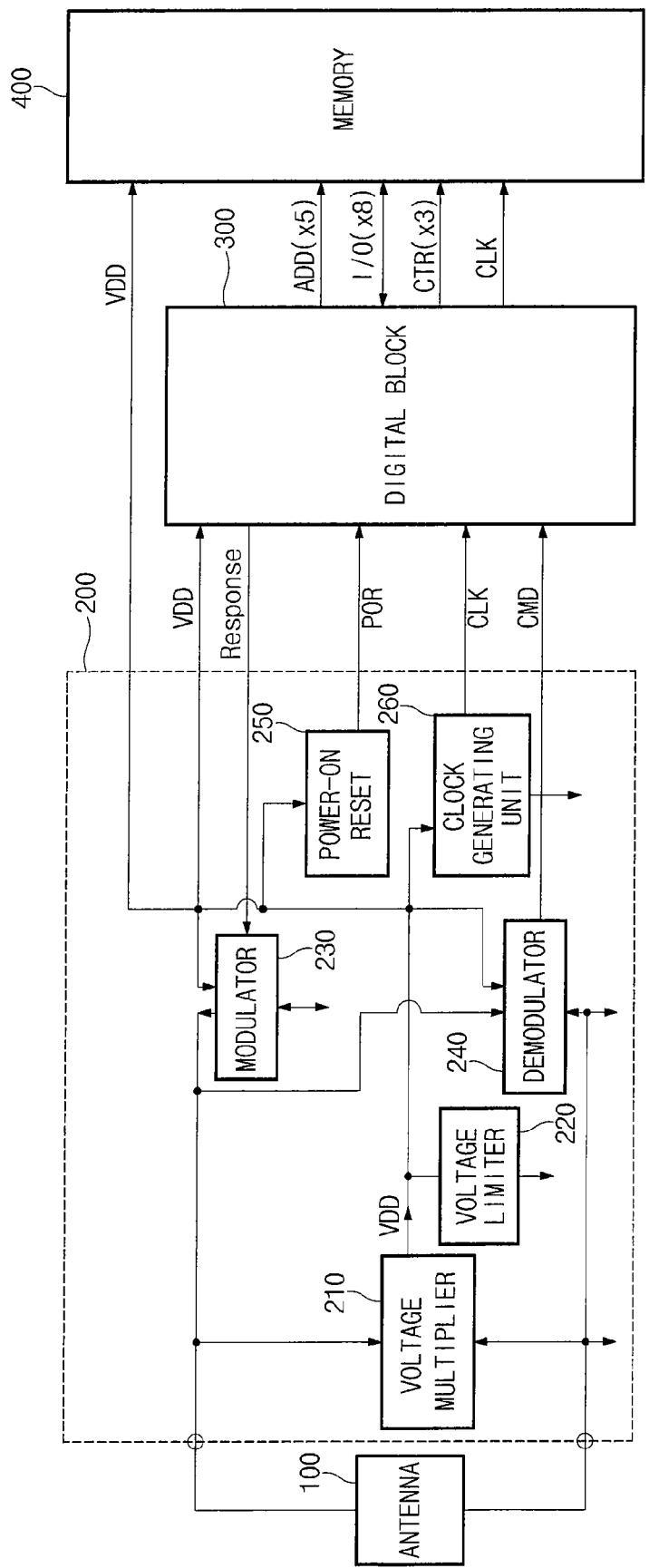
FIG. 3 is a diagram illustrating a RFID device according to an embodiment of the present invention.

FIG. 3 is a diagram illustrating a RFID device according to an embodiment of the present invention.

In this embodiment, the RFID device includes an antenna 100, an analog block 200, a digital block 300 and a memory 400.

The antenna 100 transmits and receives a radio frequency signal of an external reader or writer.

The analog block 200 includes a voltage multiplier 210, a voltage limiter 220, a modulator 230, a demodulator 240, a power-on reset unit 250 and a clock generating unit 260.

The voltage multiplier 210 generates a power voltage VDD of the RFID device in response to the radio frequency signal applied from the antenna 100.

The voltage limiter 220 limits a voltage of the radio frequency signal applied from the antenna 100.

The modulator 230 modulates a response signal Response applied from the digital block 200 to transmit the signal Response to the antenna 100.

The demodulator 240 detects an operation command signal from the radio frequency signal applied from the antenna 100 by a power voltage VDD to output the command signal CMD to the digital block 300.

The power-on reset unit 250 senses the power voltage VDD applied from the voltage multiplier 210 to output a power-on reset signal POR for controlling a reset operation of the digital block 300.

The clock generating unit 260 generates a clock signal CLK by the power voltage VDD.

The digital block 300 receives the power voltage VDD, the power-on reset signal POR, the clock signal CLK and the command signal CMD from the analog block 200 to output the response signal Response to the analog block 200. The digital block 300 outputs an address ADD, data I/O, a control signal CTR and the clock signal CLK to the memory 400.

The memory 400 has a plurality of memory cells each including a nonvolatile ferroelectric capacitor.

Figure 4:
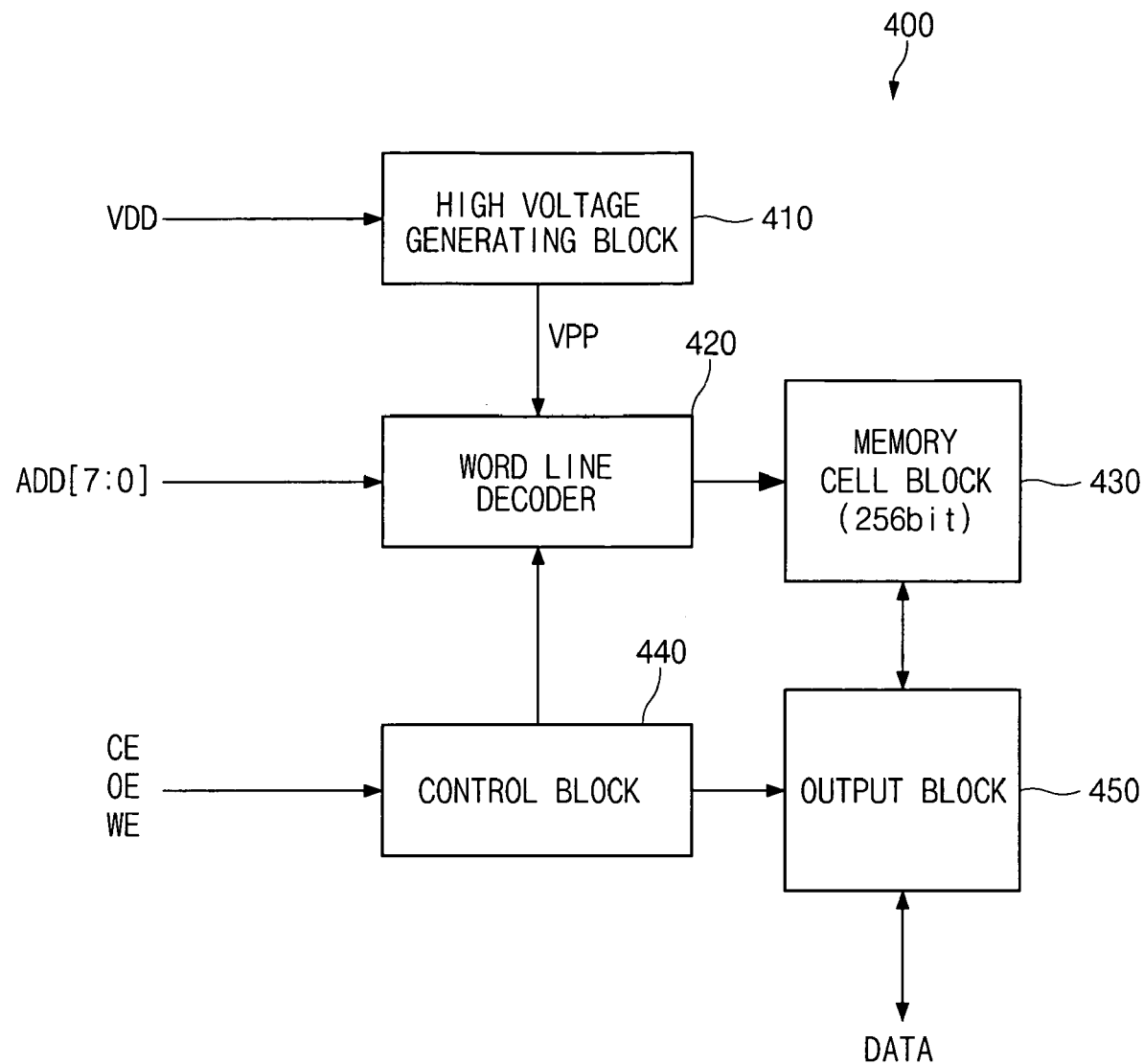
FIG. 4 is a diagram illustrating a nonvolatile ferroelectric memory device of FIG. 3.

FIG. 4 is a diagram illustrating the memory device for low voltage of FIG. 3.

The memory 400 for low voltage includes a high voltage generating block 410, a word line decoder 420, a memory cell block 430, a control block 440 and an output block 450.

The high voltage generating block 410 generates a high voltage VPP with the power voltage VDD.

The word line decoder 420 decodes an address ADD[7:0] and selects a corresponding word line of the memory cell block 430.

The memory cell block 430 has a plurality of memory cells.

The control block 440 receives a chip enable signal CE, an output enable signal OE, and a write enable signal WE to output a control signal for access operations to the word line decoder 420 and the output block 450.

The output block 450 senses and amplifies data on a selected bit line to transmit externally inputted data to the memory cell block 430.

Figure 5:
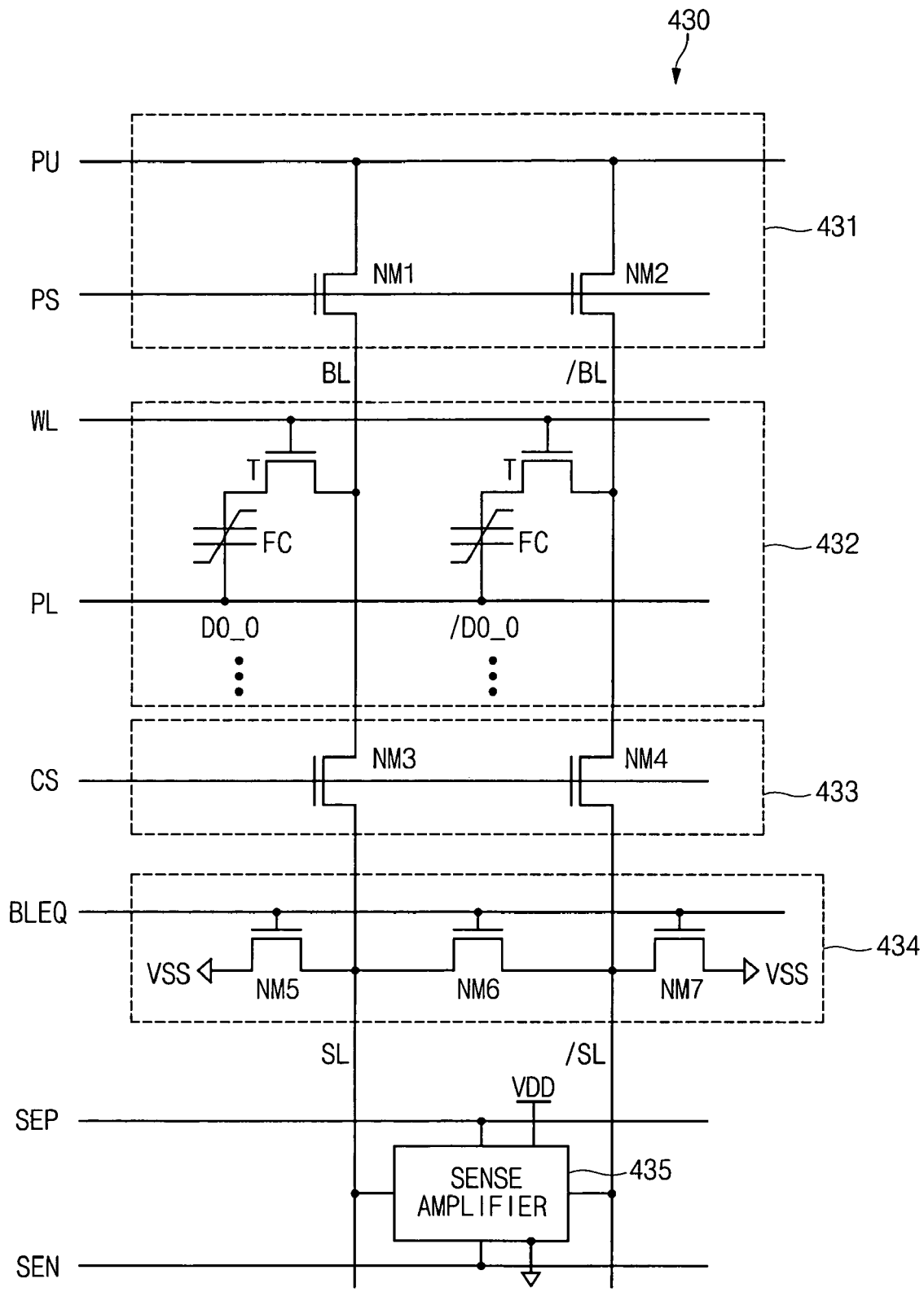
FIG. 5 is a circuit diagram illustrating a memory cell array unit of FIG. 4.

FIG. 5 is a circuit diagram illustrating the memory cell array unit 430 of FIG. 4.

The memory cell block 430 includes a bit line pull-up unit 431, a memory cell array 432, a selection unit 433, a bit line pull-down unit 434 and a sense amplifier 435.

The bit line pull-up unit 431 includes NMOS transistors NM1 and NM2 which are connected between a pull-up voltage line PU and paired bit lines BL, /BL, respectively. The NMOS transistors NM1 and NM2 control connection of the paired bit lines BL and /BL to the pull-up voltage line PU in response to a pull-up control signal PS. The high voltage VPP is applied to the pull-up voltage line PU, and the pull-up control signal PS is configured to have a high voltage VPP level so that the high voltage VPP is applied to the paired bit lines BL and /BL.

The memory cell array 432 has a plurality of memory cells each connected to the paired bit lines BL, /BL, a plurality of word lines WL and a plurality of plate lines PL. Each of the plurality of memory cells includes a ferroelectric capacitor FC and a transistor T which are connected between the plate line PL and the paired bit lines BL, /BL.

The selection unit 433 includes NMOS transistors NM3 and NM4 which are connected to the bit lines BL and /BL, respectively between the memory cell array 432 and the bit line pull-down unit 434. The NMOS transistors NM3 and NM4 controls connection of the paired bit lines BL, /BL and paired sensing lines SL, /SL in response to a column selection signal CS.

The bit line pull-down unit 434 includes NMOS transistors NM5-NM7. The NMOS transistor NM5 is connected between a ground voltage terminal VSS and the sensing line SL, and the NMOS transistor NM6 is connected between the paired sensing lines SL and /SL. The NMOS transistor NM7, which is connected between the sensing line /SL and the ground voltage terminal VSS, equalizes the paired sensing lines SL and /SL to the ground voltage level in response to a bit line equalizing signal BLEQ. Here, the bit line equalizing signal BLEQ has a power voltage VDD level when it is activated.

The sense amplifier 435 connected between the paired sensing lines SL, /SL amplifies data using a voltage difference of the paired sensing lines SL, /SL in response to sense amplifier enable signals SEN, SEP.

In the memory cell block 430, the bit line pull-up unit 431, the memory cell array 432 and the selection unit 433 are driven by a high voltage level, and the bit line pull-down unit 434 and the sense amplifier 435 are driven by a power voltage VDD level.

Figure 6:
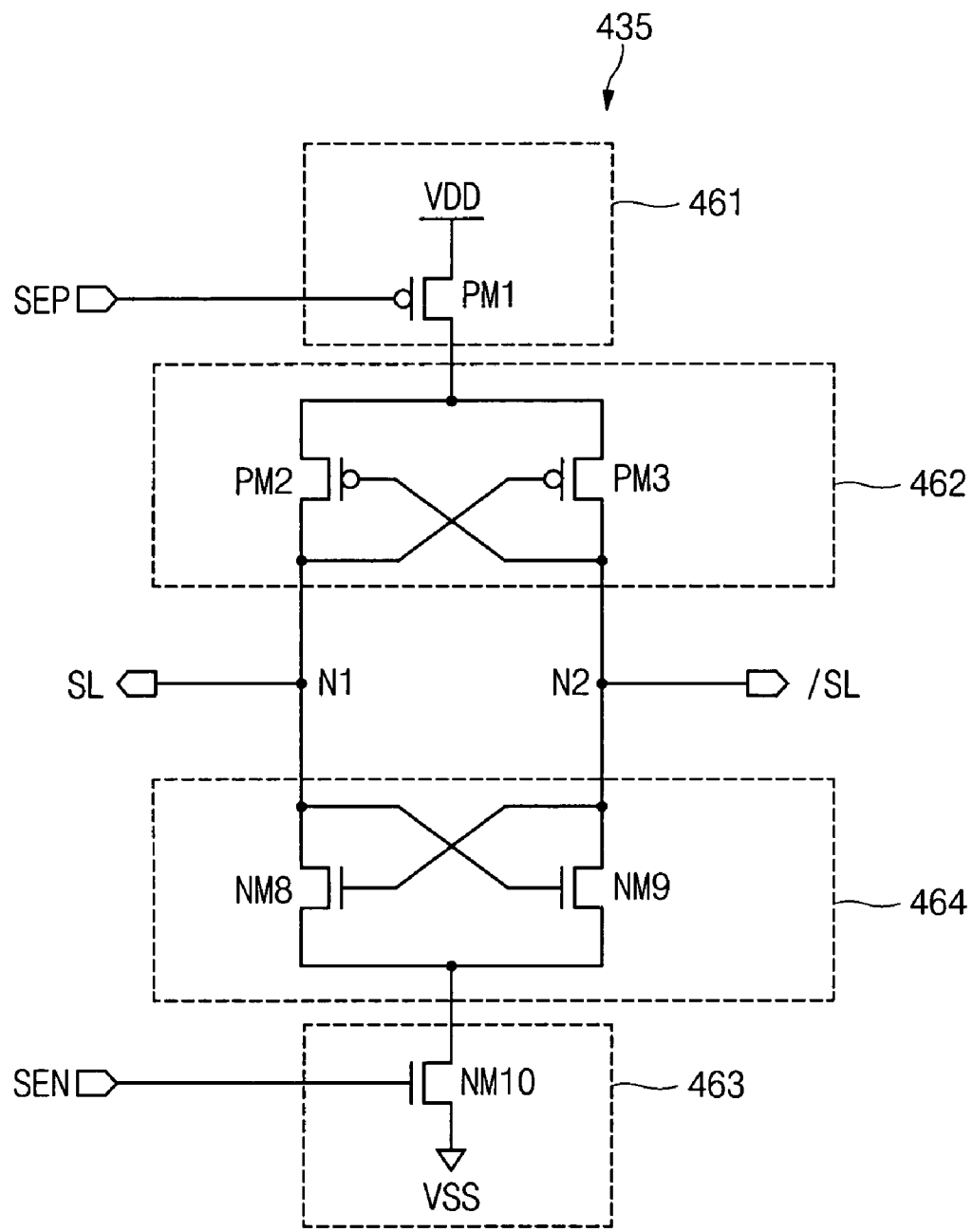
FIG. 6 is a circuit diagram illustrating a sense amplifier of FIG. 5.

FIG. 6 is a circuit diagram illustrating the sense amplifier 435 of FIG. 5.

The sense amplifier 435 includes a pull-up unit 461, a pull-up latch unit 462, a pull-down unit 463 and a pull-down latch unit 464.

The pull-up unit 461 includes a PMOS transistor PM1 which is connected between the power voltage terminal VDD and the pull-up latch unit 462. The PMOS transistor PM1 applies the power voltage level to the pull-up latch unit 462 in response to the sense amplifier enable signal SEP.

The pull-up latch unit 462, which includes cross-coupled PMOS transistors PM2 and PM3, latches and amplifies an output voltage of the pull-up unit 461. Output nodes N1 and N2 are connected to the paired sensing lines SL and /SL, respectively.

The pull-down unit 463 includes a NMOS transistor NM10 which is connected between the ground voltage terminal VSS and the pull-down latch unit 464. The NMOS transistor NM10 applies the ground voltage level to the pull-down latch unit 464 in response to the sense amplifier enable signal SEN.

The pull-down latch unit 464 latches and amplifies an output voltage from the pull-down unit 463. The pull-down latch unit 464 includes cross-coupled NMOS transistors NM8 and NM9.

Figure 7:
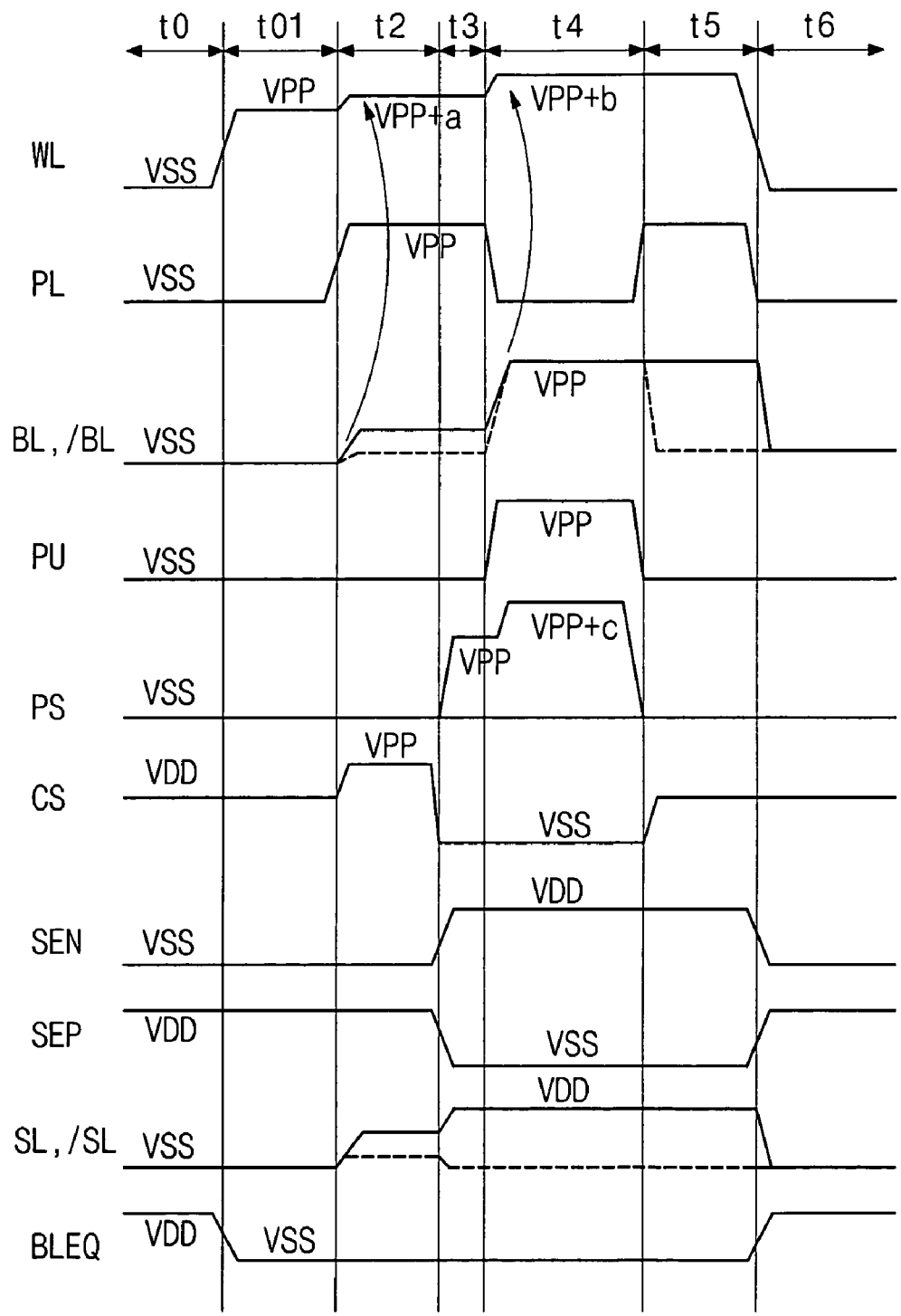
FIG. 7 is a timing diagram illustrating a memory cell array unit of FIG. 4.

FIG. 7 is a timing diagram illustrating a memory cell array unit of FIG. 4.

In a period t0, the bit line equalizing signal BLEQ is activated, and the paired bit lines are precharged.

The word line WL is activated to the high voltage VPP level in a period t1, transits into a level VPP+a higher than the high voltage VPP level in periods t2 and t3, and transits into a level VPP+b higher than the level VPP+a in periods t4 and t5. When the voltage level of the word line WL is boosted into VPP+a and VPP+b, a high voltage level can be applied to a cell under consideration of a threshold voltage of the cell transistor T.

In the period t2, when the plate line PL is activated to the high voltage VPP level, the paired bit lines BL, /BL and the paired sensing lines SL, /SL start being developed. The column selecting signal CS transits into the high voltage VPP level to turn on the NMOS transistors NM3 and NM4 so that signals can be sufficiently transmitted between the paired bit lines BL, /BL and the paired sensing lines SL, /SL.

Before entry of the period t3, the column selecting signal CS is deactivated to turn off the NMOS transistors NM3 and NM4.

In the period t3, the plate line PL remains in the high voltage VPP level, and the sense amplifier enable signals SEP and SEN are activated to drive the sense amplifier 435. The pull-up control signal PS transits into the high voltage VPP level to turn on the NMOS transistors NM1 and NM2 so that the pull-up voltage line PU is connected to the paired bit lines BL, /BL.

In the period t4, the plate line PL transits into the ground voltage level for writing data "1" in the cell, and the high voltage VPP is applied to the pull-up voltage line PU. The pull-up control signal PS is boosted into a VPP+c higher than the high voltage VPP to turn on the NMOS transistors NM1 and NM2, thereby applying a high voltage of the pull-up voltage line PU to the paired bit lines BL, /BL. Here, the column selecting signal CS remains in the ground voltage level to turn off the NMOS transistors NM3 and NM4 so that a signal of the sensing line SL is not transmitted into the bit line BL.

Before entry of the period t5, the pull-up voltage line PU and the pull-up control signal PS transit into the ground voltage level.

In the period t5, the plate line PL transits into the high voltage VPP level again for writing data "0" in the cell, and the column selecting signal CS transits into the power voltage level again to turn on the NMOS transistors NM3 and NM4. As a result, the sense amplifier 435 amplifies the column selecting signal CS to apply a signal on the sensing line SL to the bit line BL.

When the ground voltage level is applied to the sensing line SL, the ground voltage level is transmitted into the bit line BL by the NMOS transistors NM3 and NM4 so that the data "0" is written in the cell.

Meanwhile, when the power voltage level is applied to the sensing line SL, the NMOS transistors NM3 and NM4 are turned off. As a result, the power voltage level of the sensing line SL is not transmitted into the bit line BL so that the data "1" remains in the cell.

In the period t6, the bit line equalizing signal BLEQ is activated to precharge the paired bit lines.

The pull-up voltage line PU, the pull-up control signal PS, the word line WL, the plate line PL and the column selecting signal CS are activated by the high voltage level, and the bit line equalizing signal BLEQ, the sense amplifier control signals SEP and SEN are activated by the power voltage level.

As described above, a high voltage is supplied only to a cell array area and a low voltage is applied to a peripheral area in a nonvolatile ferroelectric memory of a RFID according to an embodiment of the present invention, thereby minimizing power consumption of the nonvolatile ferroelectric memory.

The foregoing description of various embodiments of the invention has been presented for purposes of illustration and description. It is not intended to be exhaustive or to limit the invention to the precise form disclosed, and modifications and variations are possible in light of the above teachings or may be acquired from practice of the invention. Thus, the embodiments were chosen and described in order to explain the principles of the invention and its practical application to enable one skilled in the art to utilize the invention in various embodiments and with various modifications as are suited to the particular use contemplated.

What is claimed is:

1. A RFID device comprising:
  an antenna adapted and configured to transmit and receive a radio frequency signal to and from an external communication apparatus;
  an analog block adapted and configured to generate a power voltage in response to the radio frequency signal received from the antenna;
  a digital block adapted and configured to receive the power voltage from the analog block, transmit a response signal to the analog block and output a memory control signal; and
  a memory adapted and configured to generate a high voltage with the power voltage and access data in response to the memory control signal, the memory having a memory cell array area driven by the high voltage and a peripheral circuit area driven by the power voltage.

2. The RFID device according to claim 1, wherein the memory comprises:
  a high voltage generating unit adapted and configured to boost the power voltage and generate the high voltage;
  a word line decoder adapted and configured to decode an address with the high voltage;
  a memory cell block adapted and configured to be driven by the word line decoder to access the data; and
  a control unit adapted and configured to receive the memory control signal and control the word line decoder and the memory cell block.

3. The RFID device according to claim 2, wherein the memory cell block comprises:
  a pull-up unit adapted and configured to apply a high voltage to a bit line in response to a pull-up control signal;
  a memory cell array including a plurality of nonvolatile memory cells each adapted and configured to store data on the bit line depending on a voltage applied to a plurality of word lines and a plurality of plate lines;

a selection unit adapted and configured to selectively transmit data on the bit line in response to a column selecting signal;

a sense amplifier adapted and configured to amplify data transmitted selectively by the selection unit; and an equalization unit adapted and configured to equalize the bit line to a ground voltage level.

4. The RFID device according to claim 3, wherein the pull-up unit, the memory cell array and the selection unit are included in the memory cell array area, and the sense amplifier and the equalization unit are included in the peripheral circuit area.

5. The RFID device according to claim 3, wherein each of the plurality of nonvolatile memory cells comprises:

a ferroelectric capacitor having a first terminal connected to the plate line; and a switch unit adapted and configured to selectively connect the bit line to a second terminal of the ferroelectric capacitor depending on a voltage on the selected one of a plurality of word lines.

6. The RFID device according to claim 3, wherein the sense amplifier comprises:

a pull-up unit adapted and configured to output a power voltage in response to a first enable signal;

a pull-up latch unit adapted and configured to pull up data on the bit line to the power voltage outputted from the pull-up unit;

a pull-down unit adapted and configured to output the ground voltage in response to a second enable signal; and a pull-down latch unit adapted and configured to pull down data on the bit line depending on the ground voltage outputted from the pull-down unit.

7. The RFID device according to claim 6, wherein the pull-up latch unit comprises a first PMOS transistor cross-coupled with a second PMOS transistor.

8. The RFID device according to claim 6, wherein the pull-down latch unit comprises a first NMOS transistor cross-coupled with a second NMOS transistor.

9. The RFID device according to claim 1, wherein the analog block comprises:

a voltage multiplier adapted and configured to generate the power voltage in response to the radio frequency signal inputted through the antenna;

a voltage limiter adapted and configured to limit the power voltage of the radio frequency signal;

a modulator adapted and configured to modulate a response signal applied from the digital block and transmit the response signal to the antenna;

a demodulator adapted and configured to detect an operation command signal from the radio frequency signal depending on an output voltage of the voltage multiplier and the voltage limiter to output the operation command signal to the digital block;

a power-on reset unit adapted and configured to detect the power voltage and control a reset operation of the digital block; and a clock generating unit adapted and configured to generate a clock signal to the digital block depending on the power voltage.

10. The RFID according to claim 9, wherein the voltage multiplier applies the power voltage to the memory.

11. A RFID device comprising:

an antenna adapted and configured to transmit and receive a radio frequency signal to and from an external communication apparatus;

an analog block adapted and configured to generate a first voltage in response to the radio frequency signal received from the antenna;

a digital block adapted and configured to receive the first voltage from the analog block, transmit a response signal to the analog block and output a memory control signal; and a memory adapted and configured to generate a second voltage which is higher than the first voltage and access data in response to the memory control signal, the memory having a memory cell array area driven by the second voltage and a peripheral circuit area driven by the first voltage.

12. The RFID device according to claim 11, wherein the first voltage is a power voltage supplied from the analog block.

13. The RFID device according to claim 11, wherein the memory comprises:

a high voltage generating unit adapted and configured to boost the first voltage and generate the second voltage;

a word line decoder adapted and configured to decode an address with the second voltage;

a memory cell block adapted and configured to be driven by the word line decoder and access data; and a control unit adapted and configured to receive the memory control signal and control the word line decoder and the memory cell block.

14. The RFID device according to claim 11, wherein the analog block comprises:

a voltage multiplier adapted and configured to generate the first voltage in response to the radio frequency signal inputted through the antenna;

a voltage limiter adapted and configured to limit the first voltage of the radio frequency signal;

a modulator adapted and configured to modulate the response signal applied from the digital block and transmit the response signal to the antenna;

a demodulator adapted and configured to detect an operation command signal from the radio frequency signal depending on an output voltage of the voltage multiplier and the voltage limiter to output the operation command signal to the digital block;

a power-on reset unit adapted and configured to sense the first voltage and control a reset operation of the digital block; and a clock generating unit adapted and configured to generate a clock signal to the digital block depending on the first voltage.

15. The RFID device according to claim 14, wherein the voltage multiplier applies the first voltage to the memory.

* * * * *